United States Patent [19]
Coveley

[11] Patent Number: 5,550,463
[45] Date of Patent: Aug. 27, 1996

[54] POWER SUPPLY CONNECTED IN PARALLEL WITH SOLID STATE SWITCH FOR PHASE CONTROL OF AVERAGE POWER TO A LOAD

[76] Inventor: Michael Coveley, Suite 101, #16 Passy Crescent, York University, North York, Ontario, Canada, M3J 3L3

[21] Appl. No.: 356,501

[22] Filed: Dec. 15, 1994

Related U.S. Application Data

[63] Continuation-in-part of Ser. No. 267,220, Jul. 1, 1994, abandoned, which is a continuation of Ser. No. 063,658, May 20, 1993, abandoned.

[51] Int. Cl.$^6$ .................................................. G05F 5/02
[52] U.S. Cl. .................................. 323/300; 315/194
[58] Field of Search .................................. 323/237, 239, 323/300, 320, 325; 315/194

[56] References Cited

U.S. PATENT DOCUMENTS

| | | | |
|---|---|---|---|
| 4,478,468 | 10/1984 | Schoen | 315/194 |
| 4,634,957 | 1/1987 | Hollaway | 323/242 |
| 4,928,055 | 5/1990 | Kaieda et al. | 323/300 |
| 5,030,890 | 7/1991 | Johnson | 315/208 |
| 5,164,636 | 11/1992 | Allaire | 315/200 A |
| 5,264,761 | 11/1993 | Johnson | 315/291 |

*Primary Examiner*—Peter S. Wong
*Assistant Examiner*—Adolf Berhane
*Attorney, Agent, or Firm*—Sim & McBurney

[57] ABSTRACT

A power supply for controlling average power to a load, such as an electric light, heater or motor, comprising a solid state switch connected in series with the load, a power supply connected in parallel with the solid state switch, and a control circuit connected intermediate the power supply and solid state switch for causing the solid state switch to conduct current through the load for a predetermined portion of each AC power cycle. The power supply collects charge whenever the solid state switch is non-conducting. According to the preferred embodiment, a current overload detector and zero crossing detector are also provided for increased reliability and precise definition of the solid state switch conduction timing.

18 Claims, 3 Drawing Sheets

POWER SUPPLY CONNECTED IN PARALLEL WITH SOLID STATE SWITCH FOR PHASE CONTROL OF AVERAGE POWER TO A LOAD

CROSS REFERENCE TO RELATED APPLICATION

This is a continuation-in-part of application Ser. No. 08/267,220, filed Jul. 1, 1994, which is a continuation of application Ser. No. 08/063,658 filed May 20, 1993, both abandoned.

FIELD OF THE INVENTION

This invention relates in general to power supplies for providing controlled power to loads such as electric lights, heaters and motors, and more particularly to a power supply capable of collecting charge during portions of an AC power supply signal during which power is not applied to the load.

BACKGROUND OF THE INVENTION

In most electrical circuits, a power switch is connected in series with a load. The function of the power switch is either to interrupt or sustain the current flow from an AC power source to the load. This power switch can be controlled by a control circuit whose function is to either energize or de-energize the load according to a specific function. For example, where the load is one or a plurality of electric lights, the control circuit may be provided for turning on the lights when a person enters a room. In this application, a PIR (passive infrared) motion detector can be used as part of the control circuit. Upon detecting such presence, the detector activates a control circuit which turns the lights on.

While the lights are on, it is also known in the art to use phase control of the solid state power switch to apply the AC supply signal to the load for a controlled fraction of each AC power cycle. For example, U.S. Pat. No. 4,478,468 (Schoen et al) discloses a line-gated switching power supply connected to a control circuit which, in turn, is connected to a solid state switch. The switch is in the form of a triac and is connected in series with a lamp. The control circuit controls the time of firing of the triac to achieve different intensities of illumination from the lamp (i.e. a longer conduction time of the triac during each AC half cycle results in greater intensity of illumination). According to the power supply of Schoen et al, a reservoir capacitor is charged during the portion of the AC cycle during which the triac is non-conducting. While the prior art system of Schoen et al is useful for providing a power supply which operates whether the AC source is continuous or intermittent (i.e. only a portion of each AC cycle being applied to the load), the specification is silent as to how the control circuit determines when zero crossings of the AC power signal have occurred. This timing is critical for proper operation of the triac. Precise detection of zero crossings of the AC power signal can be particularly difficult in the face of AC mains frequency variations. Furthermore, no means are disclosed or suggested for detecting a current overload condition within the main circuit comprising the lamp and triac, and for preventing application of further power to the load in such a condition.

SUMMARY OF THE INVENTION

According to the present invention, an improved power supply and power switch circuit are provided in which a zero crossing detector is used for reliably and precisely defining conduction times for the power switch connected in series with the load. The detection of AC mains zero crossing is independent of mains frequency variations and independent of the delay angle of firing the power switch, in contrast with the prior art system Schoen et al. The circuit of the present invention also includes a current overload detector for disabling the control circuit which controls operation of the power switch so that the power switch is disabled causing no current to flow through the load when a current overload condition is detected.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
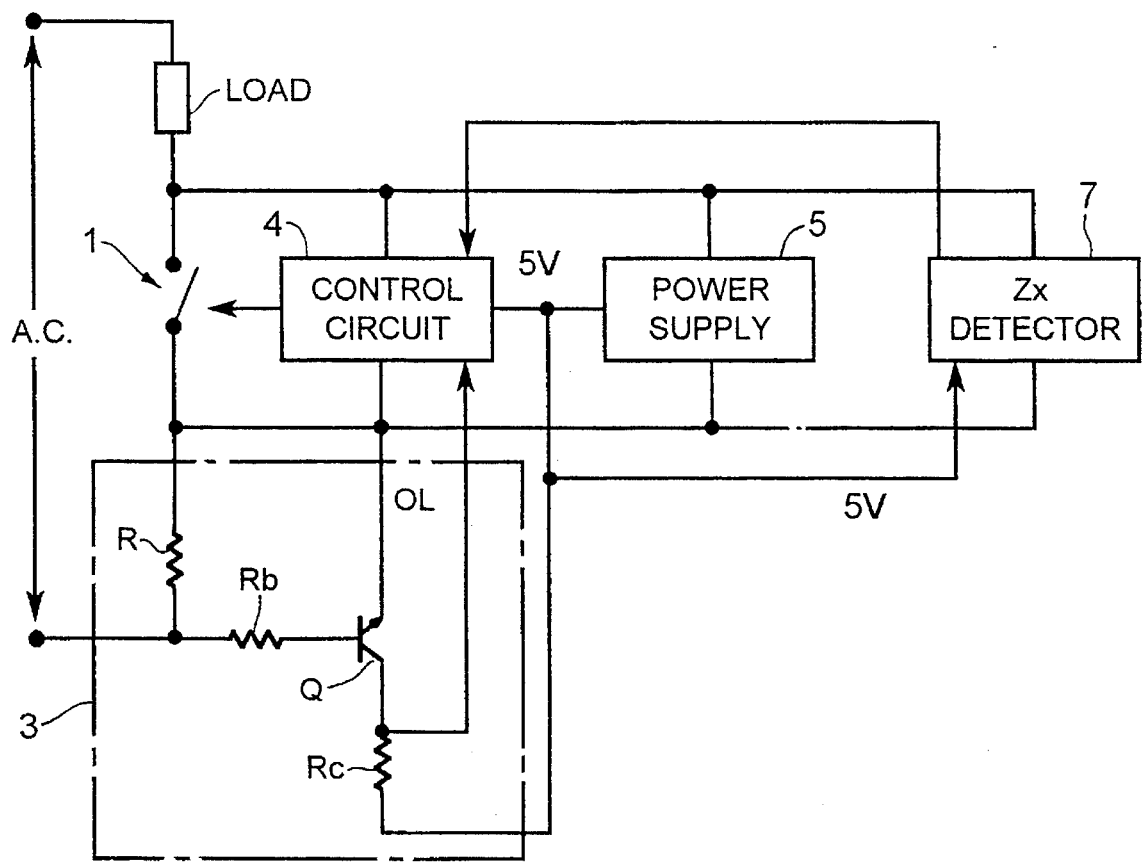
FIG. 1 is a partial schematic-block diagram showing the power supply and power switch according to the present invention in its broadest aspect.

With reference to FIG. 1, the overall system according to the present invention is shown, comprising a load (e.g. electric light, heater, motor, etc.) in series with a solid state switch 1 and a current detection resistor R of a current overload detector circuit 3. The series connection of load, switch 1 and current overload detector 3 is connected across a source of AC voltage supply. Solid state switch 1 may be a triac or other suitable switching device.

A control circuit 4, power supply 5 and zero crossing detector 7 are each connected in parallel with solid state switch 1. Generally, zero crossing detector 7 detects the zero voltage transition times of the AC supply voltage and provides this information to control circuit 4. Power supply 5 receives charge during portions of the AC power supply signal during which solid state switch 1 is non-conducting, and in response generates a regulated DC voltage for powering the control circuit 4, current overload detector 3 and zero crossing detector 7. As a result of the parallel connection of power supply 5 across solid state switch 1, when the load is turned off (i.e. solid state switch 1 is in the open state), the AC power supply signal is applied across power supply 5 which, in response, generates a regulated DC voltage for application to control circuit 4. Control circuit 4 provides a gating signal for controlling the conduction timing of solid state switch 1 in accordance with user specified parameters (e.g. potentiometer or dimmer setting for electric light, rheostat setting for heater, etc.). The current overload detector 3 detects current flowing through the load and, in the event of excessive current flow, generates a signal for disabling control circuit 4, thereby causing solid state switch 1 to become non-conducting, and thereby halting excessive current flow through the load.

Figure 2:
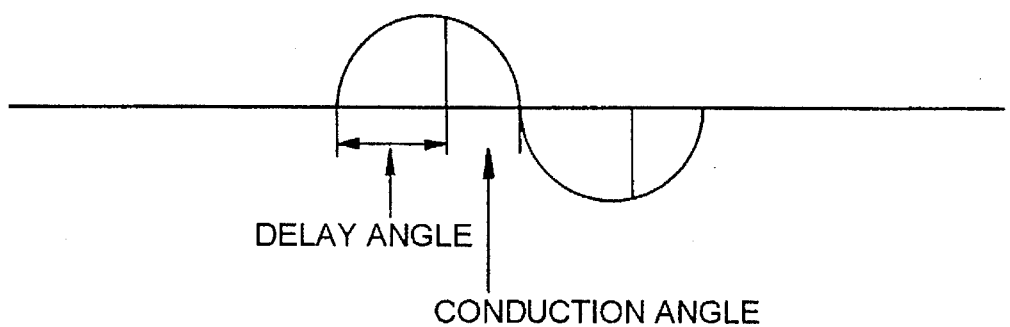
FIG. 2 is a voltage waveform showing the delay angle and conduction angle for the solid state switch shown in FIG. 1.

During normal operation of the circuit according to FIG. 1, the solid state switch 1 is caused to conduct current after a predetermined time following the negative-to-positive zero crossing of the AC power supply signal. This time period is denoted as "delay angle" and is shown in the voltage waveform of FIG. 2. Then, control circuit 4 causes the solid state switch 1 to conduct current for the remaining portion of the positive AC power signal half cycle. This remaining portion is characterized in FIG. 2 by the term "conduction angle". Likewise, the solid state switch 1 remains non-conducting during an identical delay angle following the positive-to-negative zero crossing transition of the negative AC power supply signal half-cycle, but conducts current through the load during the remaining conduction angle portion of the negative half cycle of the AC power supply signal. The relative lengths of delay angle and conduction angle may be preset by the user, as discussed above, using potentiometers, rheostats, digital control inputs, etc.

When the load is powered-up by means of controlled conduction of current through solid-state switch 1, the AC supply signal is applied to power supply 5 only during the delay angle portion of each positive half cycle of the AC power supply signal, as discussed in greater detail below.

Figure 3:
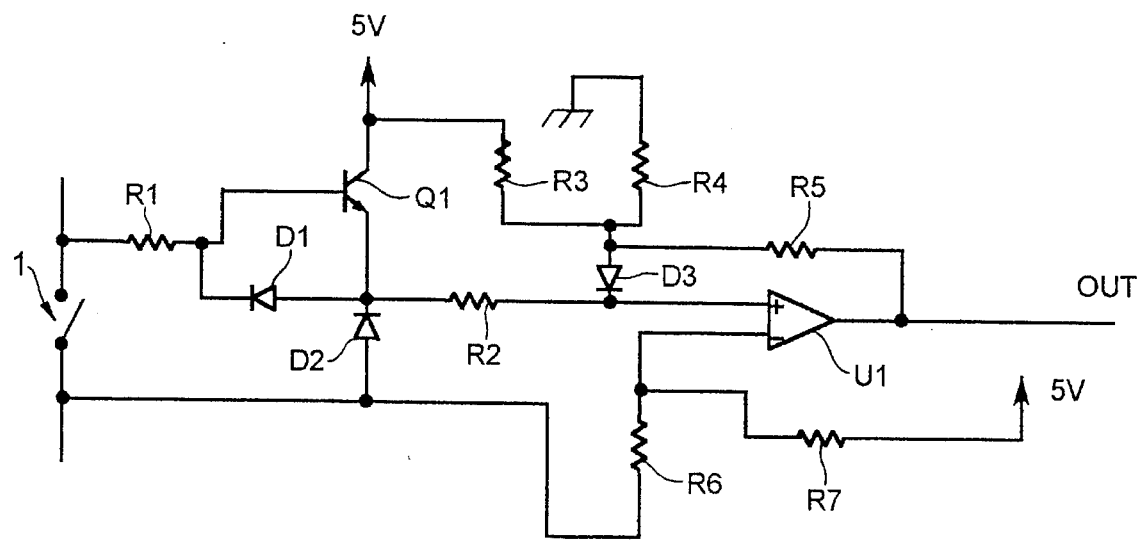
FIG. 3 is a schematic diagram showing the zero crossing detector of FIG. 1, according to the preferred embodiment.
Figure 4:
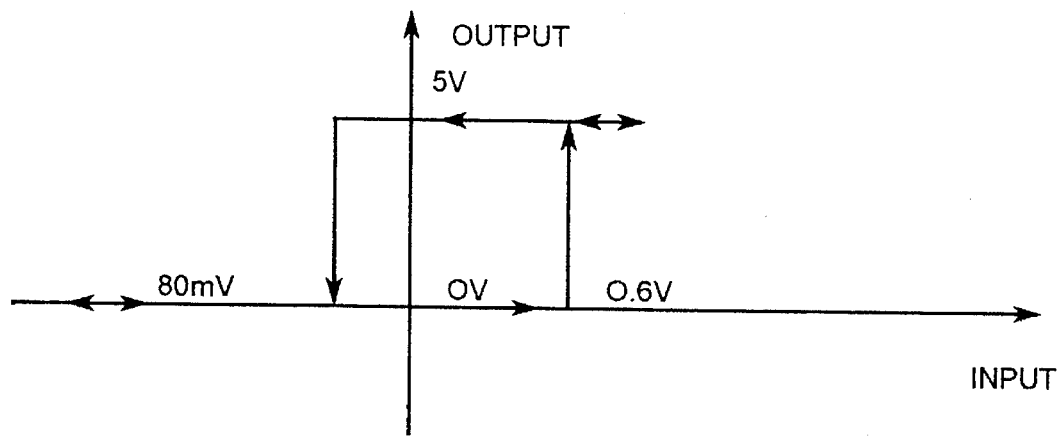
FIG. 4 is an input-versus-output voltage diagram showing operation of a comparator forming part of the zero crossing detector of FIG. 3.

Turning now to FIGS. 3 and 4, zero crossing detector 7 is shown in greater detail, for generating an output signal (out) to the control circuit 4 (FIG. 1) indicative of zero crossings of the AC mains power supply signal. This information is required by the control circuit 4 in order to precisely define the delay angle and conduction angle independently of AC mains frequency variations. The output signal (OUT) changes state at the beginning of each of AC power supply signal half-cycle independently of the delay angle. As shown in FIG. 3, zero crossing detector 7 is connected in parallel with solid state switch 1. When the load is in its "off" state (i.e. solid state switch 1 is open), the AC mains voltage signal is applied to the zero crossing detector circuit of FIG. 3 during the entire AC supply signal cycle. When the load is in its "on" state, the solid state switch 1 is fired after a predetermined delay angle, as discussed above with reference to FIGS. 1 and 2, following the AC mains zero crossing point in each half-cycle. Thus, for different delay angles (i.e. differing average power levels apply to the load), the voltage across solid state switch 1 drops to zero volts at different times during each half-cycle, depending on the user defined delay angle. The circuit according to FIG. 3 is independent of the delay angle and changes its output state voltage only at the beginning of each AC mains supply half-cycle. More particularly, the output voltage (OUT) from the circuit of FIG. 3 goes to a positive value at the beginning of each positive AC mains supply signal half-cycle and to a negative value at the beginning of each negative AC mains power supply half-cycle. Specifically, at the beginning of each positive half-cycle, the input voltage to the zero crossing detector 7 is positive such that transistor Q1 goes into a saturation mode of operation. The emitter voltage for Q1 is given by Ve=Vcc−Vce=5−0.2=4.8 volts. Therefore, the voltage applied to the non-inverting input of operational amplifier U1 becomes higher than the reference voltage applied to the inverting input of amplifier U1 via resistors R6 and R7 (i.e. reference voltage of 0.6 volts). Operational amplifier U1 generates a high output voltage which is applied to the output terminal of the zero crossing detector circuit 7. Positive feedback of the output signal (OUT) via resistor R5 and diode D3 results in the output level remaining at a constant high level after solid state switch 1 turns on during the conduction angle mode of operation (i.e. after the input voltage to the zero crossing detector 7 falls to zero volts).

During the negative half-cycle of operative, diodes D1 and D2 become forward biased, thereby pulling the voltage applied to the non-inverting input of amplifier U1 to a negative value lower than the lower threshold voltage level (i.e. −80 mV) applied to the inverting input of amplifier U1. Thus, the amplifier U1 generates a low output voltage. Again, because of the positive feedback hysteresis provided by resistor R5 and diode D3, the output voltage stays at a low level until the next positive half-cycle.

This sequence of operation of the operational amplifier U1 is shown in the hysteresis diagram of FIG. 4.

Returning to FIG. 1, the current overload detector circuit 3 is shown comprising a resistor R across which a sufficiently large voltage drop appears in the event of a current overload condition to cause transistor Q to become conducting. In this condition, the output of the overload detector circuit 3 goes to a low level (Vce of transistor Q). This low level signal is applied to the control circuit 4 to indicate a current overload within the main circuit. Preferably, transistor Q is fabricated from germanium in order to reduce the voltage drop on the series resistor R which is required to shift the transistor Q into saturation, thereby reducing the power dissipation across the resistor R. Base and collector resistors Rb and Rc, respectively, are connected to the base and collector terminals of transistor Q, in the usual manner for establishing the saturation region of operation.

Figure 5:
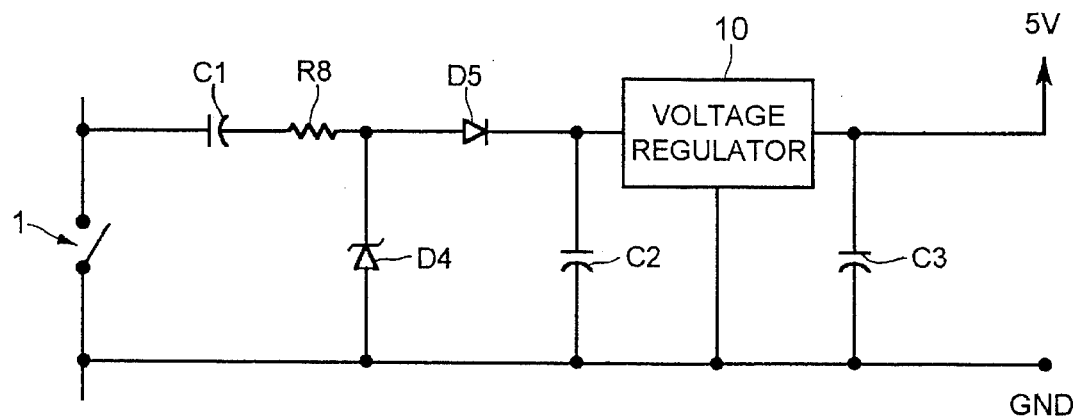
FIG. 5 is a schematic diagram showing the power supply of FIG. 1 according to a first embodiment for supplying low power DC output.

Turning now to FIG. 5, a schematic diagram is provided for power supply 5 in FIG. 1 which is useful for applications that require DC power lower than 200 milliwatts. In this embodiment, a capacitor C1 is provided as an alternative to the power switching device discussed below with reference to the alternative embodiment of FIG. 6. During the portion of the positive half-cycle of the AC power supply signal when the solid state switch 1 is non-conducting, current flows through the capacitive divider comprising capacitors C1 and C2, thereby charging reservoir capacitor C2 to a predetermined reference voltage established by the voltage across Zener diode D4. Capacitors C1 and C2 are selected to provide sufficient energy to the reservoir capacitor C2 to provide regular functioning of the voltage regulator 9 during the remainder of the positive half-cycle when the solid state switch 1 is in the conduction mode, and during each entire subsequent negative half-cycle. The charge stored in reservoir capacitor C2 is applied to the input of voltage regulator 10 which, in response, generates a regulated DC output voltage (e.g. 5 volts). The output voltage is filtered using capacitor C3 in the usual manner.

When maximum power is required by the load (i.e. minimum delay angle in FIG. 3), the time required for charging reservoir capacitor C2 is quite short (e.g. 2 milliseconds). For this eventuality, capacitor C1 must be chosen to have a sufficiently high capacitance in order to increase the charging current by effectively decreasing the impedance of the series connection of capacitors C1 and C2. However, this can result in problems which result in limiting applications of this circuit to power requirements of less than 200 milliwatts, as indicated above. In particular, AC current leaking through the load, C1, R8, D5 and C2 during each positive half-cycle, and through D4, R8, C1 and the load, during each negative half-cycle, can be sufficient to cause excessive power dissipation on the load if the capacitance of C1 is too large. Resistor R8 protects capacitors C1 and C2 from discharging current when solid state switch 1 is in a non-conduction made, and further protects solid state switch 1 during the conduction mode when capacitor C1 is discharged through Zener diode D4, resistor R8 and the solid state switch 1.

Figure 6:
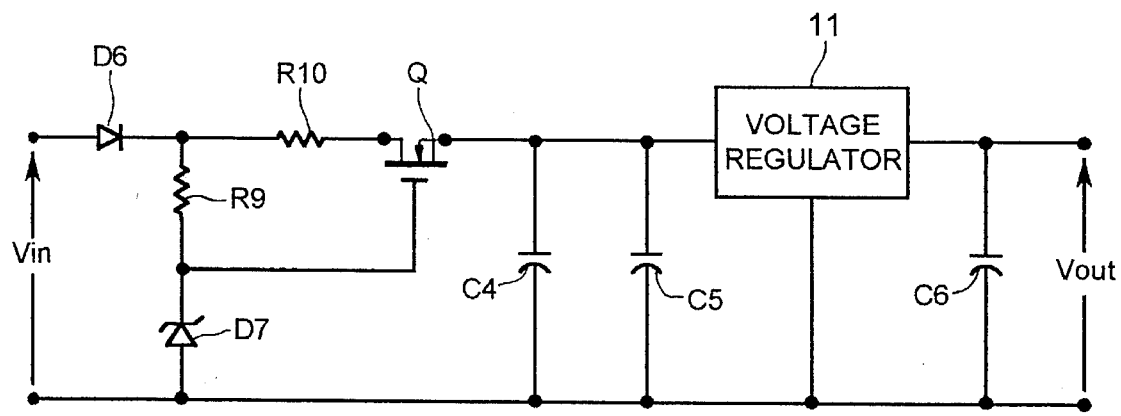
FIG. 6 is a schematic diagram of the power supply of FIG. 1 according to a second alternative embodiment for generating high power DC output.

For applications where DC power of more than 200 milliwatts is required, the circuit of FIG. 6 may be utilized wherein MOSFET transistor Q2 is provided for interrupting current flow when the reservoir capacitor C4 is charged to a reference voltage established across Zener diode D7, thereby eliminating current leakage through the load. More particularly, during both the load-off state and the AC mains positive half-cycle, rectifying diode D6 becomes conductive, causing current to flow through Zener diode D7 and resister R9. As indicated above, positive voltage developed across Zener diode D7 is applied to the gate of MOSFET transistor Q2 causing the transistor to become conductive so that reservoir capacitor C4 charges during the non-conduction delay angle for solid state switch 1. The stored energy from capacitor C4 is applied to input filtering capacitor C5 then to voltage regulator 11 which in response generates a 5 volt regulated DC output voltage. Filtering capacitor C6 is connected across the output terminals in the usual manner. Resistor R10 limits the current through MOSFET transistor Q2 during the non-conducting delay angle.

According to the best mode of the circuits according to the present invention, the following Tables illustrate preferred values for the discrete components utilized therein:

TABLE A

ZERO CROSSING DETECTION (FIG. 3)

| COMPONENT | VALUE |
| --- | --- |
| R1 | 51 KΩ |
| R2 | 220 KΩ |
| R3 | 3 KΩ |
| R4 | 1 KΩ |
| R5 | 820 KΩ |
| R6 | 20 KΩ |
| R7 | 71 KΩ |
| D1 | 1N4150 |
| D2 | 1N4150 |
| D3 | 1N4150 |

TABLE B

POWER SUPPLY (FIG. 5)

| COMPONENT | VALUE |
| --- | --- |
| C1 | 1.5 µF/250V |
| C2 | 220 µF/16V |
| C3 | 100 nF |
| R8 | 30 Ω |
| D4 | 1N4745 |
| D5 | 1N4001 |
| VOLTAGE REG. | L7805CV |

TABLE C

POWER SUPPLY (FIG. 6)

| COMPONENT | VALUE |
| --- | --- |
| C4 | 330 µF/35V |
| C5 | 1 µF |
| C6 | 300 nF |
| R9 | 7.5 KΩ |
| R10 | 50 KΩ |
| D6 | 2A/200V |

TABLE C-continued

POWER SUPPLY (FIG. 6)

| COMPONENT | VALUE |
| --- | --- |
| D7 | 16V |
| Q | IRF620 |
| VOLTAGE REG. | L7805CV |

In summary, according to the present invention, a circuit is provided for applying variable power to a load via selectively switching current through the load. The circuit of the present invention incorporates overload current detection to protect against excessive current flowing through the load. The circuit of the present invention also provides zero crossing detection for reliable and precise generation of delay angle and conduction angle by the control circuit for operating the solid state switch. Furthermore, according to one embodiment, the power supply of the present invention eliminates the requirement of a semi-conductor switch for limiting leakage current for low power applications.

Alternative embodiments and variations of the invention are possible within the sphere and scope of the claims appended hereto.

We claim:

1. A circuit for controlling average power applied to a load from a source of alternating supply voltage, comprising:
   (a) a solid state switch connected in series with said load across said source of alternating supply voltage;
   (b) a zero crossing detector connected in parallel with said solid state switch for receiving said alternating supply voltage and in response generating an output signal indicative of each zero crossing of said alternating supply voltage, said zero crossing detector including a positive feedback loop to maintain generally the magnitude of said output signal for its duration;
   (c) a control circuit connected in parallel with said solid state switch for receiving said output signal from said zero crossing detector and in response generating and applying a gating signal to said solid state switch whereby said solid state switch is caused to conduct current after a predetermined delay time following each said zero crossing of said alternating supply voltage; and
   (d) a power supply connected in parallel with said solid state switch for receiving charging current from said source of alternating supply voltage when said solid state switch is not conducting current, and in response generating a regulated DC output voltage for application to said control circuit and said zero crossing detector.

2. The circuit of claim 1, further comprising a current overload detector connected in series with said load and said solid state switch for detecting current flowing through said load in excess of a predetermined amount and in response generating a signal for disabling said control circuit and thereby disabling said solid state switch.

3. The circuit of claim 2, wherein said current overload detector includes a resistor connected to said solid state switch and transistor means having a control input connected to said resistor and a signal output connected to said control circuit, said transistor means being enabled in response to a voltage drop across said resistor in excess of a predetermined voltage corresponding to said predetermined amount of current flowing through said load.

4. The circuit of claim 1, wherein said solid state switch is a triac having a first signal terminal connected to said load, a gate terminal connected to said control circuit, and a second signal terminal connected to said source of alternating supply voltage.

5. A circuit for controlling average power applied to a load from a source of alternating supply voltage, comprising:
(a) a solid state switch connected in series with said load across said source of alternating supply voltage;
(b) a zero crossing detector connected in parallel with said solid state switch for receiving said alternating supply voltage and in response generating an output signal indicative of each zero crossing of said alternating supply voltage;
(c) a control circuit connected in parallel with said solid state switch for receiving said output signal from said zero crossing detector and in response generating and applying a gating signal to said solid state switch whereby said solid state switch is caused to conduct current after a predetermined delay time following each said zero crossing of said alternating supply voltage; and
(d) a power supply connected in parallel with said solid state switch for receiving charging current from said source of alternating supply voltage when said solid state switch is not conducting current, and in response generating a regulated DC output voltage for application to said control circuit and said zero crossing detector, wherein said zero crossing detector includes:
transistor means having a control input connected to a first terminal of said solid state switch, a signal input for receiving said regulated DC output voltage, and a signal output;
first diode means having an anode connected to said signal output and a cathode connected to said control input;
second diode having an anode connected to a second terminal of said solid state switch and a cathode connected to the anode of said first diode means and said signal output of said transistor means;
operational amplifier means having a first input connected to said signal output of said transistor means, a second input for receiving a source of threshold voltage, and an output connected in a positive feedback path to said first input, for generating a first polarity output signal responsive to a positive going zero crossing of said alternating supply voltage and an opposite polarity output signal responsive to a negative going zero crossing of said alternating supply voltage.

6. The circuit of claim 5, further comprising a current overload detector connected in series with said load and said solid state switch for detecting current flowing through said load in excess of a predetermined amount and in response generating a signal for disabling said control circuit and thereby disabling said solid state switch.

7. The circuit of claim 6, wherein said current overload detector includes a resistor connected to said solid state switch and transistor means having a control input connected to said resistor and a signal output connected to said control circuit, said transistor means being enabled in response to a voltage drop across said resistor in excess of a predetermined voltage corresponding to said predetermined amount of current flowing through said load.

8. The circuit of claim 7, wherein said solid state switch is a triac having a first signal terminal connected to said load, a gate terminal connected to said control circuit, and a second signal terminal connected to said source of alternating supply voltage.

9. A circuit for controlling average power applied to a load from a source of alternating supply voltage, comprising:
(a) a solid state switch connected in series with said load across said source of alternating supply voltage;
(b) a zero crossing detector connected in parallel with said solid state switch for receiving said alternating supply voltage and in response generating an output signal indicative of each zero crossing of said alternating supply voltage;
(c) a control circuit connected in parallel with said solid state switch for receiving said output signal from said zero crossing detector and in response generating and applying a gating signal to said solid state switch whereby said solid state switch is caused to conduct current after a predetermined delay time following each said zero crossing of said alternating supply voltage; and
(d) a power supply connected in parallel with said solid state switch for receiving charging current from said source of alternating supply voltage when said solid state switch is not conducting current, and in response generating a regulated DC output voltage for application to said control circuit and said zero crossing detector, wherein said power supply includes:
a first capacitor having first and second terminals, said first terminal of said first capacitor being connected to a first signal terminal of said solid state switch;
a resistor having first and second terminals, said first terminal of said resistor being connected to said second terminal of said first capacitor;
a Zener diode having a cathode connected to an opposite signal terminal of said solid state switch and an anode connected to said second terminal of said resistor;
a further diode having an anode and cathode, said anode being connected to said second terminal of said resistor;
a second capacitor having a first terminal connected to said cathode of said further diode and a second terminal connected to said opposite signal terminal of said solid state switch, said second capacitor operating as a charge reservoir;
a voltage regulator having a first input connected to said first terminal of said second capacitor, a second input connected to said opposite signal terminal of said solid state switch, and an output terminal, for generating said regulated DC output voltage in response to charge accumulated in said second capacitor; and
a filtering output capacitor connected to said output terminal of said voltage regulator and said opposite signal terminal of said solid state switch.

10. The circuit of claim 6, further comprising a current overload detector connected in series with said load and said solid state switch for detecting current flowing through said load in excess of a predetermined amount and in response generating a signal for disabling said control circuit and thereby disabling said solid state switch.

11. The circuit of claim 10, wherein said current overload detector includes a resistor connected to said solid state switch and transistor means having a control input connected to said resistor and a signal output connected to said control circuit, said transistor means being enabled in response to a voltage drop across said resistor in excess of a predetermined voltage corresponding to said predetermined amount of current flowing through said load.

12. A circuit for controlling average power applied to a load from a source of alternating supply voltage, comprising:

(a) a solid state switch connected in series with said load across said source of alternating supply voltage;

(b) a zero crossing detector connected in parallel with said solid state switch for receiving said alternating supply voltage and in response generating an output signal indicative of each zero crossing of said alternating supply voltage;

(c) a control circuit connected in parallel with said solid state switch for receiving said output signal from said zero crossing detector and in response generating and applying a gating signal to said solid state switch whereby said solid state switch is caused to conduct current after a predetermined delay time following each said zero crossing of said alternating supply voltage; and (d) a power supply connected in parallel with said solid state switch for receiving charging current from said source of alternating supply voltage when said solid state switch is not conducting current, and in response generating a regulated DC output voltage for application to said control circuit and said zero crossing detector wherein said power supply includes:

a diode having a cathode and anode, said anode being connected to a first signal terminal of said solid state switch;

a first resistor having first and second terminals, said first terminal of said resistor being connected to said cathode of said diode;

a Zener diode having a cathode connected to an opposite signal terminal of said solid state switch and an anode connected to said second terminal of said first resistor;

a further diode having an anode and cathode, said anode being connected to said second terminal of said first resistor;

a second resistor having first and second terminals, said first terminal being connected to the first terminal of said first resistor;

a transistor having first and second signal terminals and a control terminal, said first signal being connected to the second terminal of said second resistor and said control terminal being connected to the cathode of said Zener diode;

a first capacitor having a first terminal connected to the second signal terminal of said transistor and a second terminal connected to said opposite signal terminal of said solid state switch;

a second capacitor having a first terminal connected to the second signal terminal of said transistor and a second terminal connected to said opposite signal terminal of said solid state switch, said second capacitor operating as a charge reservoir;

a voltage regulator having a first input connected to said first terminals of said first and second capacitors, a second input connected to said opposite signal terminal of said solid state switch, and an output terminal, for generating said regulated DC output voltage in response to charge accumulated in said second capacitor; and a filtering output capacitor connected to said output terminal of said voltage regulator and said opposite signal terminal of said solid state switch.

13. The circuit of claim 12, wherein said solid state switch is a triac having a first signal terminal connected to said load, a gate terminal connected to said control circuit, and a second signal terminal connected to said source of alternating supply voltage.

14. The circuit of claim 7, further comprising a current overload detector connected in series with said load and said solid state switch for detecting current flowing through said load in excess of a predetermined amount and in response generating a signal for disabling said control circuit and thereby disabling said solid state switch.

15. The circuit of claim 14, wherein said current overload detector includes a resistor connected to said solid state switch and transistor means having a control input connected to said resistor and a signal output connected to said control circuit, said transistor means being enabled in response to a voltage drop across said resistor in excess of a predetermined voltage corresponding to said predetermined amount of current flowing through said load.

16. The circuit of claim 15, wherein said solid state switch is a triac having a first signal terminal connected to said load, a gate terminal connected to said control circuit, and a second signal terminal connected to said source of alternating supply voltage.

17. A circuit for controlling average power applied to a load from a source of alternating supply voltage, comprising:

(a) a solid state switch connected in series with said load across said source of alternating supply voltage;

(b) a zero crossing detector connected in parallel with said solid state switch for receiving said alternating supply voltage and in response generating an output signal indicative of each zero crossing of said alternating supply voltage;

(c) a control circuit connected in parallel with said solid state switch for receiving said output signal from said zero crossing detector and in response generating and applying a gating signal to said switch whereby said solid state switch is caused to conduct current after a predetermined delay time following each said zero crossing of said alternating supply voltage;

(d) a power supply connected in parallel with said solid state switch for receiving charging current from said source of alternating supply voltage when said solid state switch is not conducting current, and in response generating a regulated DC output voltage for application to said control circuit and said zero crossing detector; and (e) a current overload detector connected in series with said load and said solid state switch for detecting current flowing through said load in excess of a predetermined amount and in response generating a signal for disabling said control circuit and thereby disabling said solid state switch, said current overload detector including a resistor connected to said solid state switch and transistor means having a control input connected to said resistor and a signal output connected to said control circuit, said transistor means being enabled in response to a voltage drop across said resistor in excess of a predetermined voltage corresponding to said predetermined amount of current flowing through said load.

18. The circuit of claim 17, wherein said solid state switch is a triac having a first signal terminal connected to said load, a gate terminal connected to said control circuit, and a second signal terminal connected to said source of alternating supply voltage.

\* \* \* \* \*